Aug. 18, 1931.  W. C. STEVENS  1,819,991
BAND CUTTING MACHINE
Filed Sept. 10, 1927  4 Sheets-Sheet 1

INVENTOR.
WILLIAM C. STEVENS.
BY
Ely & Barrow
ATTORNEYS.

Aug. 18, 1931.  W. C. STEVENS  1,819,991
BAND CUTTING MACHINE
Filed Sept. 10, 1927  4 Sheets-Sheet 3

INVENTOR.
WILLIAM C. STEVENS.
BY Ely V. Barrow
ATTORNEYS.

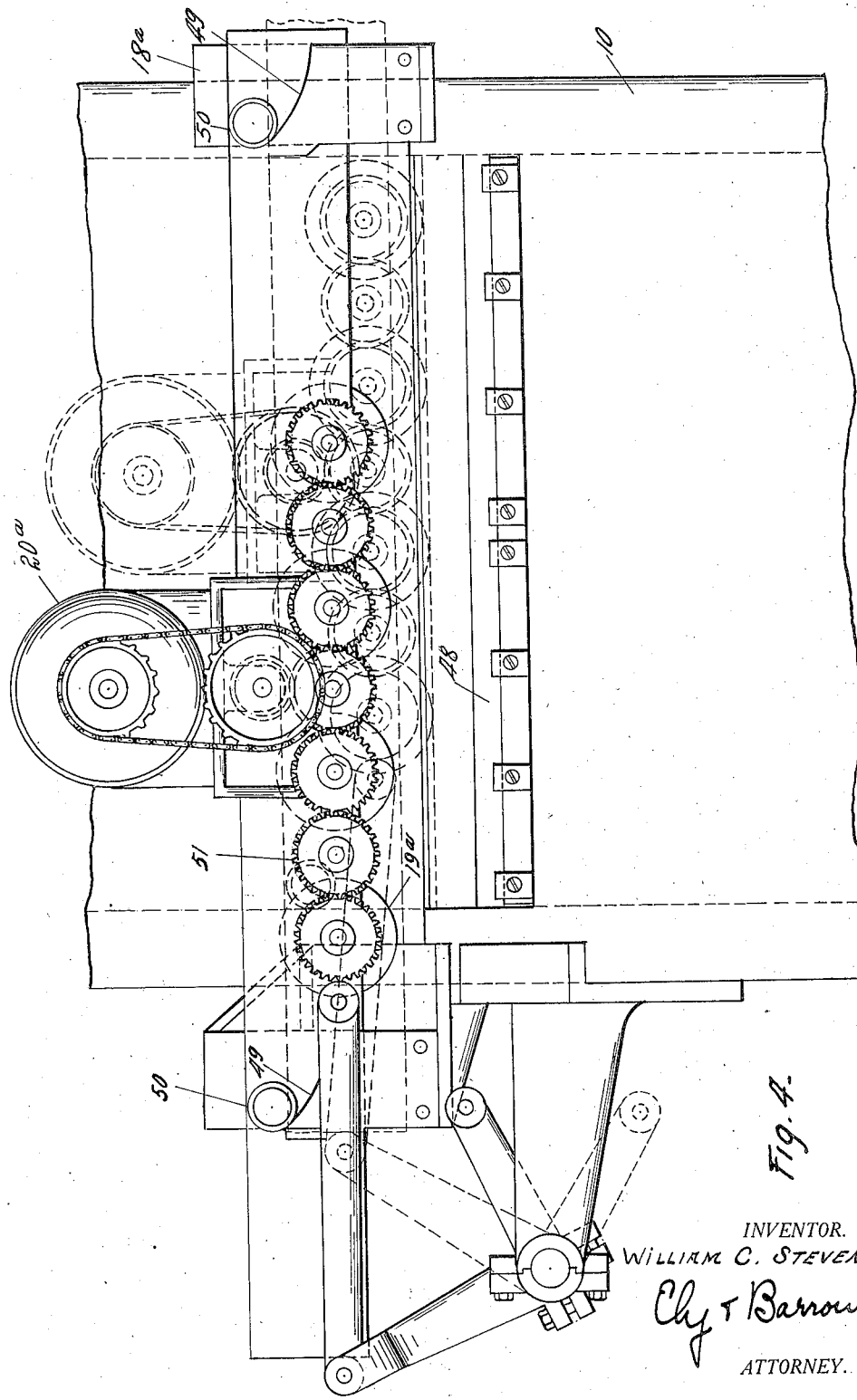

Patented Aug. 18, 1931

1,819,991

UNITED STATES PATENT OFFICE

WILLIAM C. STEVENS, OF AKRON, OHIO, ASSIGNOR TO THE FIRESTONE TIRE AND RUBBER COMPANY, OF AKRON, OHIO, A CORPORATION OF OHIO

BAND CUTTING MACHINE

Application filed September 10, 1927. Serial No. 218,817.

This invention relates to band cutting machines and especially to machines for cutting tire tread or like bands and forming a skived edge for splicing.

An object of the device is to provide means for effectively and efficiently cutting continuous bands of a tough rubber, fabric, or like composition. A further object is to devise means for forming a true skived edge on the material. Another object is to devise means for automatically and accurately gauging and cutting uniform lengths of the strip or band material.

The foregoing and other objects are obtained by the construction illustrated in the accompanying drawings and described below. It is to be understood that the invention is not limited to the specific form thereof disclosed herein.

Of the accompanying drawings,

Figure 1 is a side elevation of a machine embodying the principles of the invention;

Figure 1$^a$ is a detail view of the cam and cam follower shown in dotted lines in Figure 1;

Figure 4 is a similar view of a modified form of the machine;

Figure 1:
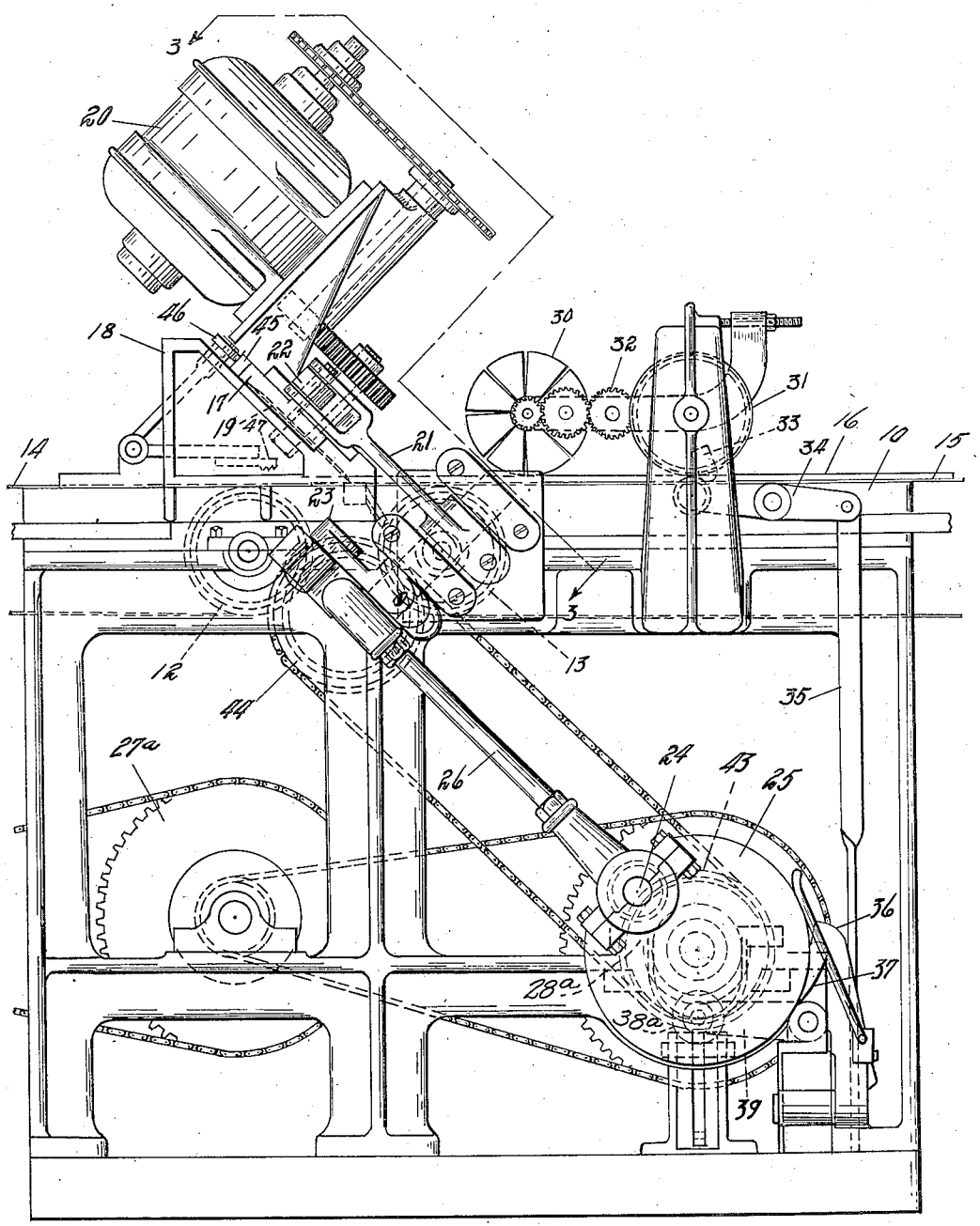
Figure 1A:
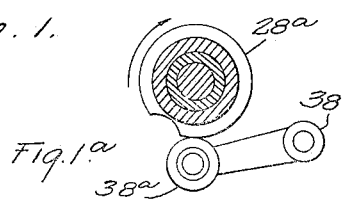
Figure 2:
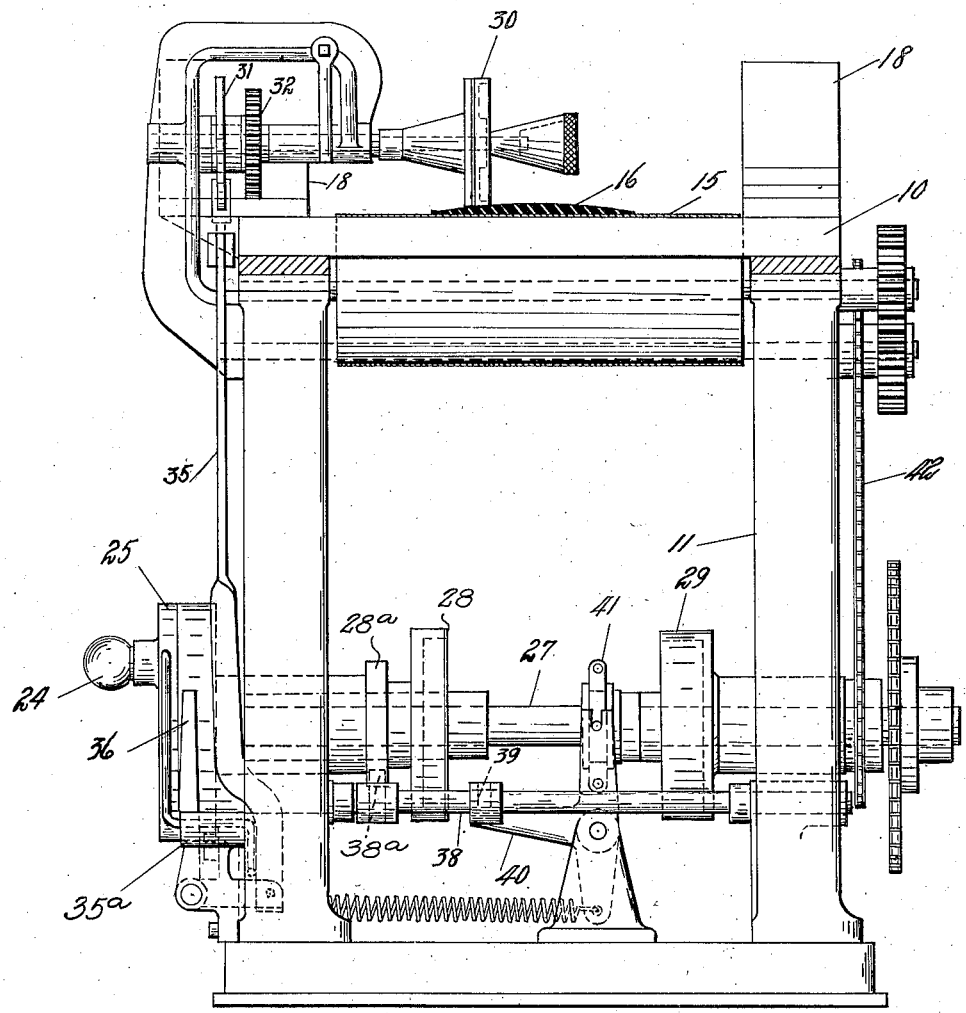
Figure 2 is an end elevation of a portion of the machine.
Figure 3:
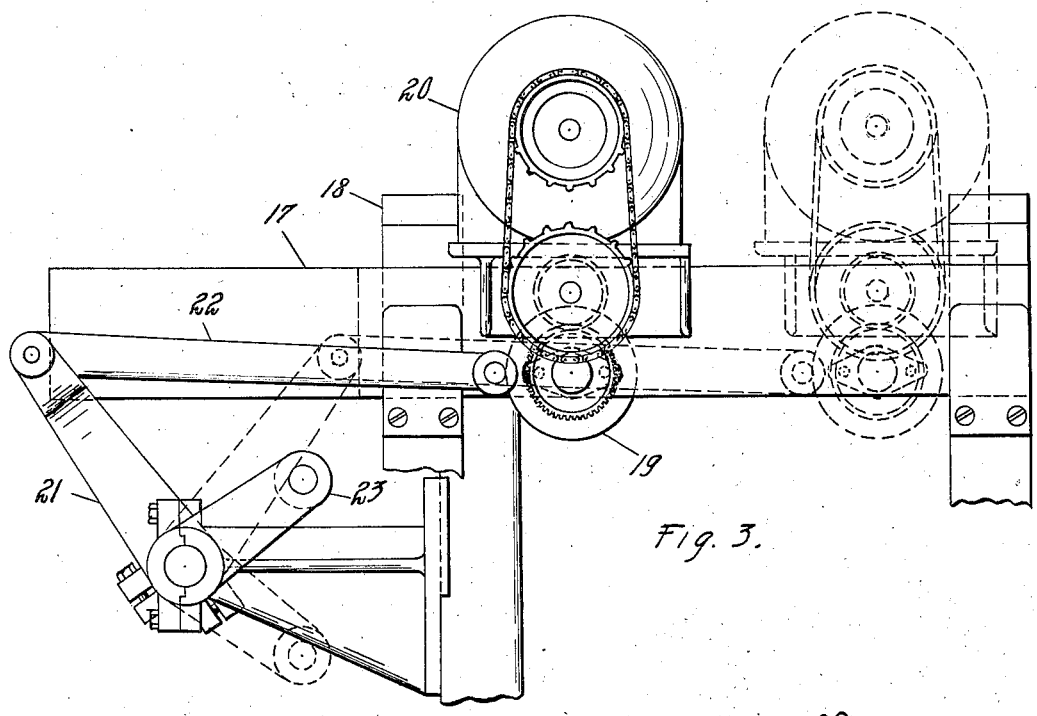
Figure 3 is a view of another portion of the machine as viewed from the line 3—3 of Figure 1.

Referring to the drawings, 10 represents a table supported by frame 11 and having mounted thereon a pair of driven rolls 12 and 13. Conveyor belts 14 and 15, respectively, are trained over the rolls and serve to carry the strip or band material 16 past the cutter. A reciprocable bar or carriage 17 is slidably mounted on a pair of supporting brackets 18, 18, the carriage being disposed at an acute angle with respect to table 10 so that a rotary, disc-shaped, cutting knife 19, journaled in said carriage, will engage material 16 on a line between said rolls when the carriage is reciprocated, as illustrated in Figures 1 and 3. Due to the angularity of the carriage and of the cutting disc journaled therein, a skived or tapered surface will be formed on the cut ends of the band, as shown in detail in Figure 6, whereby the skived ends may be subsequently spliced. The cutting disc is suitably geared to a motor 20 mounted on carriage 17 for rotating said disc.

In order to reciprocate carriage 17, a bell crank mounted on the side of table 10, has one arm 21 connected to the carriage by a rod 22 and its other arm 23 connected to crank pin 24 on plate 25 by pitman 26, the ends of which have ball and socket engagement with arm 23 and crank pin 24, respectively. Main drive shaft 27 is driven by a suitable motor (not shown) through a reduction drive 27$^a$ and is arranged to rotate plate 25 through friction clutch mechanism 28 and to operate the conveyors 14 and 15 through clutch 29, the two clutches being alternately thrown into operative engagement by a trip device automatically actuated by the passage of a definite length of material. Means for operating the trip device comprises a segmental gauge wheel 30, the periphery thereof being adjustable to various circumferences and being arranged to engage the band 16 and to be rotated thereby. The gauge wheel is so adjusted that the passage of a desired length of band 16 thereunder turning the gauge wheel, will rotate a cam 31 through a suitable gear train 32 until the cam makes one complete revolution. A cam lug 33 fixed to cam 31 trips the end of lever 34 as it passes the same and actuates connecting rod 35 to rock bell crank 35$^a$ and disengage pawl 36 laterally from stop lug 37 which projects from plate 25. The latter is thus permitted to be rotated by friction clutch 28 to make one complete revolution reciprocating the cutting disc across the band to the dotted line position and then back again, when pawl 36 will again engage lug 37 preventing further rotation of plate 25 and causing the friction members of clutch 28 to rotate relatively to each other. When pawl 36 is disengaged permitting the members of the friction clutch to rotate together, cam 28$^a$ rotates with clutch 28 displacing a cam follower 38$^a$ to rock shaft 38 which in turn presses lever 39 attached thereto against lever arm 40 of clutch yoke 41 which throws out clutch 29. Conveyors 14 and 15, which are driven through chain 42 trained over sprockets 43 and 44, are thus stopped while the cutting operation is being performed by the throwing out of clutch 29. When the cutting is completed and carriage 17 comes to rest, clutch 29 is again thrown in to operate the conveyor belts and feed the stock past the cutting disc. A cam surface 45 is provided on carriage 17 so that a cam roller 46 will be raised to lift hinged clamping bar 47 when the carriage is at rest. As the latter begins its cutting stroke the cam roller is dropped, permitting bar 47 to clamp strip 16 adjacent the path of the cutting disc. Wooden bar or block 48 is mounted between rolls 12 and 13 directly below the cutting disc, and serves as a support for strip 16 as the latter is being cut.

Figures 5, 6:
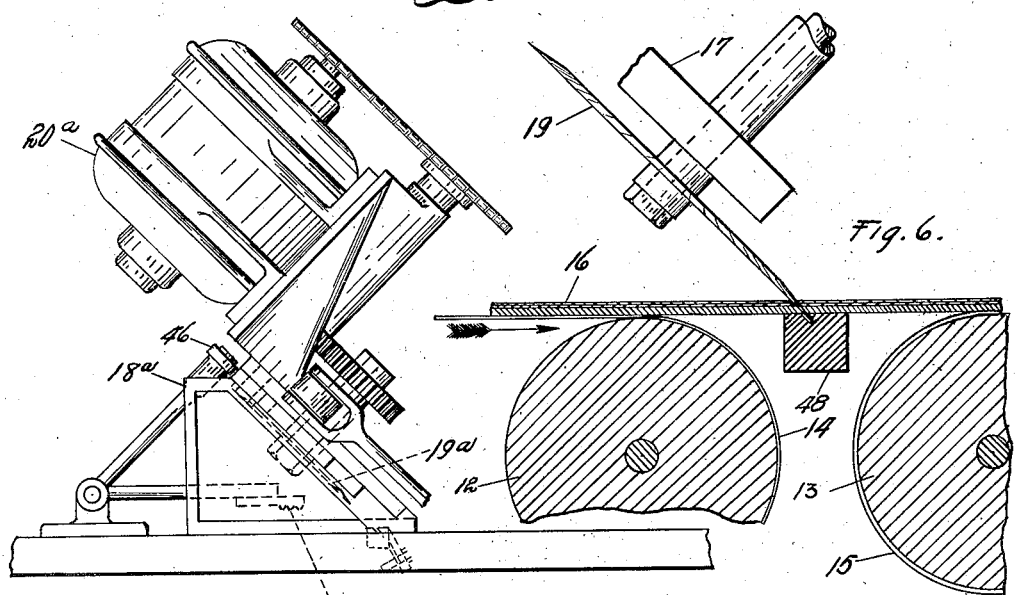
Figure 5 is a side elevation thereof.
Figure 6 is a sectional detail view illustrating the cutting operation.

The modified construction illustrated in Figures 4 and 5 comprises a plurality of cutting discs 19ª journaled in the carriage, whereby a very wide band or a plurality of bands may be cut on the machine. In this form the brackets 18ª are provided with cam surfaces 49 to engage cam rollers 50 at the end of the return stroke of the carriage to lift the latter and carry the knives upwardly from the band to the full line position of Figure 4. At the beginning of the cutting stroke the knives are first lowered to their cutting level and are then carried straight across bar 48 to the dotted line position of Figure 4 by the reciprocation of the carriage, the cutting stroke of the knives being slightly greater than the distance therebetween in order to obtain a continuous cut across the band material. All of knives 19ª are driven in the same direction from a single motor 20ª by means of intermediate gears 51 and the bell crank for operating the carriage is actuated in a like manner to that of the first described form.

In operation, a band or strip is carried along by conveyors 14 and 15 until a predetermined length of the material rotates the gauge wheel sufficiently to operate the trip device. This will throw out clutch 29 to stop the conveyor and will throw in clutch mechanism 28 to operate the cutting disc as more fully described above. As soon as the cutter disc carriage has completed its return stroke, clutch 29 is again thrown in to operate the conveyors for feeding along a succeeding length of the material, the operation of the device being entirely automatic.

Modifications of the structure herein disclosed may be resorted to without departing from the spirit of the invention or the scope thereof as defined by the appended claims.

What is claimed is:

1. A machine of the class described comprising in combination, a conveyor for carrying a continuous strip of material, a carriage mounted to slide transversely of said conveyor, a rotatable cutting disc mounted on said carriage, means for rotating said disc, means for reciprocating said carriage, means for operating said conveyor, a trip device serving to set said conveyor actuating means and said carriage reciprocating means alternately into operative motion, and an adjustable gauge wheel engaging said material and operated by the passage of a predetermined length thereof to actuate said trip device.

2. A machine of the class described comprising in combination, a conveyor for carrying a continuous strip of material, a carriage mounted to slide transversely of said conveyor, a rotatable cutting disc mounted on said carriage, means for rotating said disc, means for reciprocating said carriage, means for operating said conveyor, a trip device serving to set said conveyor actuating means and said carriage reciprocating means alternately into operative motion, and means engaging said material and operated by the passage of a predetermined length thereof to actuate said trip device.

3. A machine of the class described comprising in combination, a conveyor for carrying a continuous strip of material, a carriage mounted to slide transversely of said conveyor, a rotatable cutting disc mounted on said carriage, means for rotating said disc, means for reciprocating said carriage, means for operating said conveyor, and means actuated by passage of predetermined lengths of material to stop the conveyor and set said carriage reciprocating means into motion.

4. A machine of the class described comprising in combination, a conveyor for carrying a continuous strip of material, a carriage mounted to slide transversely of said conveyor, a rotatable cutting disc mounted on said carriage to reciprocate in a fixed plane oblique to the plane of the conveyor, means for rotating said disc, means for reciprocating said carriage, and means for operating said conveyor.

5. In combination with a conveyor for carrying strip material, a carriage mounted to slide transversely of said conveyor and in a plane oblique to the plane of the conveyor, rotary knives journaled on said carriage, means for rotating the knives, and means for reciprocating said carriage for cutting said strip material to form a bevelled end surface thereon.

6. A machine of the class described comprising in combination, a conveyor for carrying a continuous strip of material, a carriage mounted to slide transversely of said conveyor, a cutter on said carriage, means for reciprocating said carriage, means for operating said conveyor, a trip device serving to set said conveyor actuating means and said carriage reciprocating means alternately into operative motion, and an adjustable gauge wheel engaging said material and operated by the passage of a predetermined length thereof to actuate said trip device.

7. A machine of the class described comprising in combination, a conveyor for carrying a continuous strip of material, a carriage mounted to slide transversely of said conveyor, a cutter on said carriage, means for reciprocating said carriage, means for operating said conveyor, a trip device serving to set said conveyor actuating means and said carriage reciprocating means alternately into operative motion, and means engaging said material and operated by the passage of a predetermined length thereof to actuate said trip device.

8. In combination with a conveyor for carrying strip material, a carriage slideably mounted transversely of said conveyor and in a plane oblique to the plane of the conveyor, a cutter on said carriage, and means for reciprocating said carriage for cutting said strip material to form a bevelled end surface thereon.

WILLIAM C. STEVENS.